United States Patent [19]

Andersson et al.

[11] 4,112,392

[45] Sep. 5, 1978

[54] METHOD AND APPARATUS FOR PRODUCING LASER PULSES WITH HIGH REPRODUCIBILITY

[76] Inventors: Hans E. B. Andersson, 14, Napenkroken, Lund, Sweden, S-222 47; Wladimir Wladimiroff, 43B, St. Olofsgatan, Uppsala, Sweden, S-753 30

[21] Appl. No.: 792,102

[22] Filed: Apr. 29, 1977

Related U.S. Application Data

[63] Continuation of Ser. No. 614,215, Sep. 17, 1975, abandoned.

[51] Int. Cl.$^2$ .............................................. H01S 3/097
[52] U.S. Cl. ............................................. 331/94.5 PE
[58] Field of Search ................... 331/94.5 PE, 94.5 G

[56] References Cited

PUBLICATIONS

Tarasenko et al., Pribory i Tekhnika Eksperimenta, No. 1, pp. 183–184, Jan.–Feb. 1973, (Translation in Instrument Exp. Tech. only provided pp. 221–222).

Primary Examiner—William L. Sikes
Assistant Examiner—Marcus S. Rasco
Attorney, Agent, or Firm—Kenyon & Kenyon, Reilly, Carr & Chapin

[57] ABSTRACT

A coaxial high repetition rate pulsed gas laser is provided, having a peak value pulse to pulse reproducibility better than 1% at a repetition rate of up to 400 Hz. This is accomplished by synchronizing the time evolution of the high tension laser electrode voltage with the gas break-down delay period in such a way that the laser output and stability are optimized.

3 Claims, 8 Drawing Figures

METHOD AND APPARATUS FOR PRODUCING LASER PULSES WITH HIGH REPRODUCIBILITY

This is a continuation of application Ser. No. 614,215, filed September 17, 1975, now abandoned.

BACKGROUND OF THE INVENTION

1. FIELD OF THE INVENTION

This invention relates to pulsed gas lasers, and more particularly, to method and apparatus for achieving the production of laser pulses with a high repetition rate in combination with good reproducibility by using laser gas media such as $N_2$, Nc, Ar, Xe and He.

2. DESCRIPTION OF THE PRIOR ART

Several types of pulsed gas lasers have been described in various publications, see for example H. Gundel and W. Ross: "Zur Anregung ung Emission im $N_2$—Impulsgaslaser", Analer der Physik 7 (1974):3 p. 263–276. Said article compares a number of known nitrogen pulsed lasers. However, only a few papers deal with the electrical properties of such pulsed lasers, and to our knowledge, a numerical treatment of the relevant equivalent circuits is found in only one publication, namely Andersson and Tobin: "Electrical Breakdown in an Axial-field Nitrogen Laser", Physica Scripta, 9 (1974) p. 7–14.

Pulsed gas lasers, and particularly, pulsed $N_2$ laser systems, are often used as dye laser excitation sources. To qualify as a good pumping source for dye lasers, the pulse to pulse reproducibility must be good; preferably better than 1% and the pumping laser must also have a pulse repetition rate capability of at least 100 Hz to facilitate proper sampling and signal extracting techniques. The fact is that in almost all applications of pulsed lasers, for instance in kinetic spectroscopy and fluorescence decay analysis as well as in the risetime calibration of fast detection systems, the pulse height and risetime reproducibility directly determine the accuracy and time resolution of the information obtained. Further the repetition rate to be used, must be maintainable during a full working day and not only for a couple of minutes.

Especially in axially excited pulsed gas lasers, it has so far not been possible to achieve good pulse to pulse reproducibility in combination with high repetition rate capability. Further, the maximum output pulse energy varies a lot between similar lasers. Those problems have been pointed out in said article of Gundel and Ross. Lack of good reproducibility is clearly seen if the laser pulses are recorded by sampling techniques. Such a recording, being typical for known lasers, is shown in FIG. 11 page 565 in a paper of Ericsson and Lidholt: "Generation of Short Light Pulses by Superradiance in Gases", Ark. Fys. 37 (1968) p. 557–568.

Therefore, clearly there is a need for high repetition rate pulsed gas lasers with good pules to pulse reproducibility.

SUMMARY OF THE INVENTION

In accordance with the principles of the present invention, a synchronizing inductor is provided in the laser system in such a way that the time evolution of an applied high tension laser electrode pulse voltage is synchronized to the gas breakdown delay period of the laser tube for optimum laser ouptut and stability. Said inductor is preferably incorporated in or fixed mounted on the laser tube and with an inductance value that depends on the specific date of the laser tube it is being connected to. Such relevant data are for instance, the length and diameter of the tube, the voltage maximum of the used high voltage laser electrode pulse and the gas pressure in the gas discharge capillary. Laser tubes with an adaption inductor according to the invention can further be interchanged or replaced without need for an accompanying adjustment of the high voltage pulse generator of the laser.

The novel features of the invention are set forth with particularity in the appended claims. The invention will be best understood from the following description when read in conjuncton with the accompanying drawings.

DESCRIPTION OF THE PREFERRED EMBODIMENTS

Figure 1:
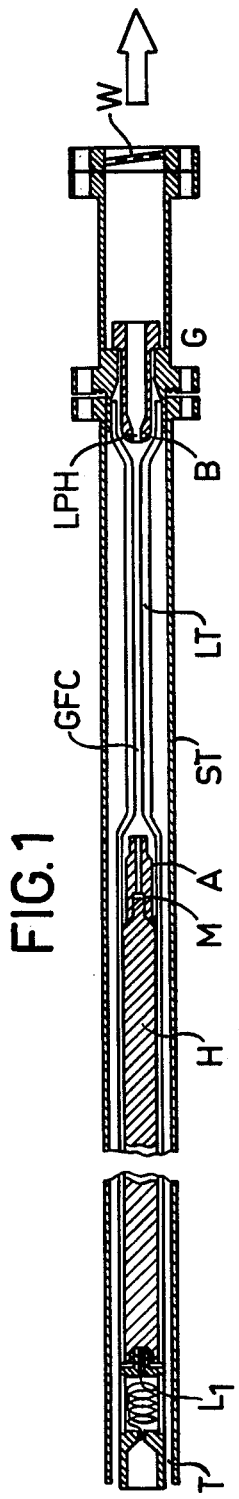
FIG. 1 is a sectional view of a laser tube with a synchronizing inductor for use with the present invention.

FIG. 1 illustrates a sectional view of a laser tube with the new synchronizing inductor $L_1$, which in a preferred embodiment of the present invention is mounted on the laser tube by one of the tube's terminals T. The synchronizing inductor $L_1$ is thereby connected to the outer end of an internal rod-shaped solid metal high voltage conductor H of a predetermined length. The inner end M of the high voltage conductor H is connected to one electrode A, of the two electrodes A, B, of the laser tube LT, between which the electrical discharge will take place in a gas filled capillary GFC. The other electrode B is grounded to form the second terminal and has a hole LPH, through which the emitted laser pulse will pass, as indicated by the arrow in the right end of the figure. To prevent the gas in the laser tube LT to escape through the hole LPH in the electrode B, the laser tube is terminated with a window W in the shape of a plan parallel disk, a lens etc. The grounded electrode B is mounted in an electrode holder G. The electrode holder G is also designed to be a supporting element for a shielding tube ST which is coaxially surrounding the whole laser tube with its internal high voltage conductor H. The high voltage conductor H is thereby forming a capacitor $C_2$ (FIG. 2 and 3) together with the shielding tube ST. The laser pulse characteristics are dependent on the capacitance of $C_2$ as well as the dimensions of the capillary GFC, the gas medium in the capillary, the medium's gas pressure and the pulse voltage applied to the electrodes via the synchronizing inductor $L_1$ and the high voltage conductor H.

Figure 2:
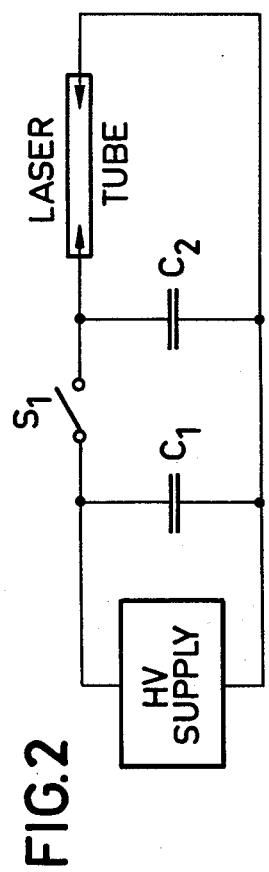
FIG. 2 is a diagram showing the principles of an axially excited pulsed gas laser.

FIG. 2 illustrates schematically how the high voltage pulses, applied to the laser tube, are produced. A high voltage source (DC, full or half wave rectified AC or unrectified AC) is charging the capacitor $C_1$. A normally open switch $S_1$ (e.g. an electronically controlled spark gap which can be actuated by triggering) closes the laser tube circuit whereby $C_2$ is first charged by $C_1$ and shortly after discharged through the laser tube by break-down of the gas medium in the capillary GFC.

Figure 3:
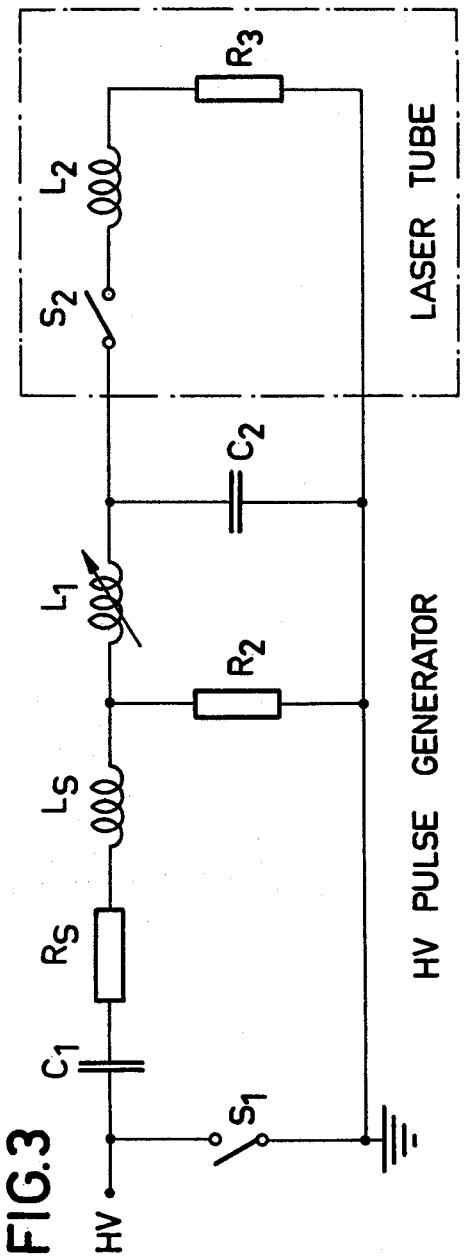
FIG. 3 is a diagram showing a pulsed gas laser according to the present invention.

The equivalent electrical circuits of the high voltage pulse generator and the laser tube are illustrated in FIG. 3. The pulse generator has an equivalent internal resistance $P_s$ and self inductance $L_s$. A bleeder resistor $R_2$ is provided in the high voltage pulse generator, through which the capacitor $C_1$ is charged when the switlch $S_1$ is open.

The laser tube has an equivalent circuit consisting of an equivalent internal resistance $R_3$ and self inductance $L_2$ in series with an equivalent switching function $S_2$. This equivalent switching function $S_2$ is carried out by the breakdown of the gas in the capillary.

Between the pulse generator and the capillary GFC of the tube the new synchronizing inductor $L_1$ is connected and the junction between the synchronizing inductor $L_1$ and the high voltage electrode A (FIG. 1) is shunted by the capacitance $C_2$ formed by said shielding tube ST and the high voltage electrode H.

Figure 4:
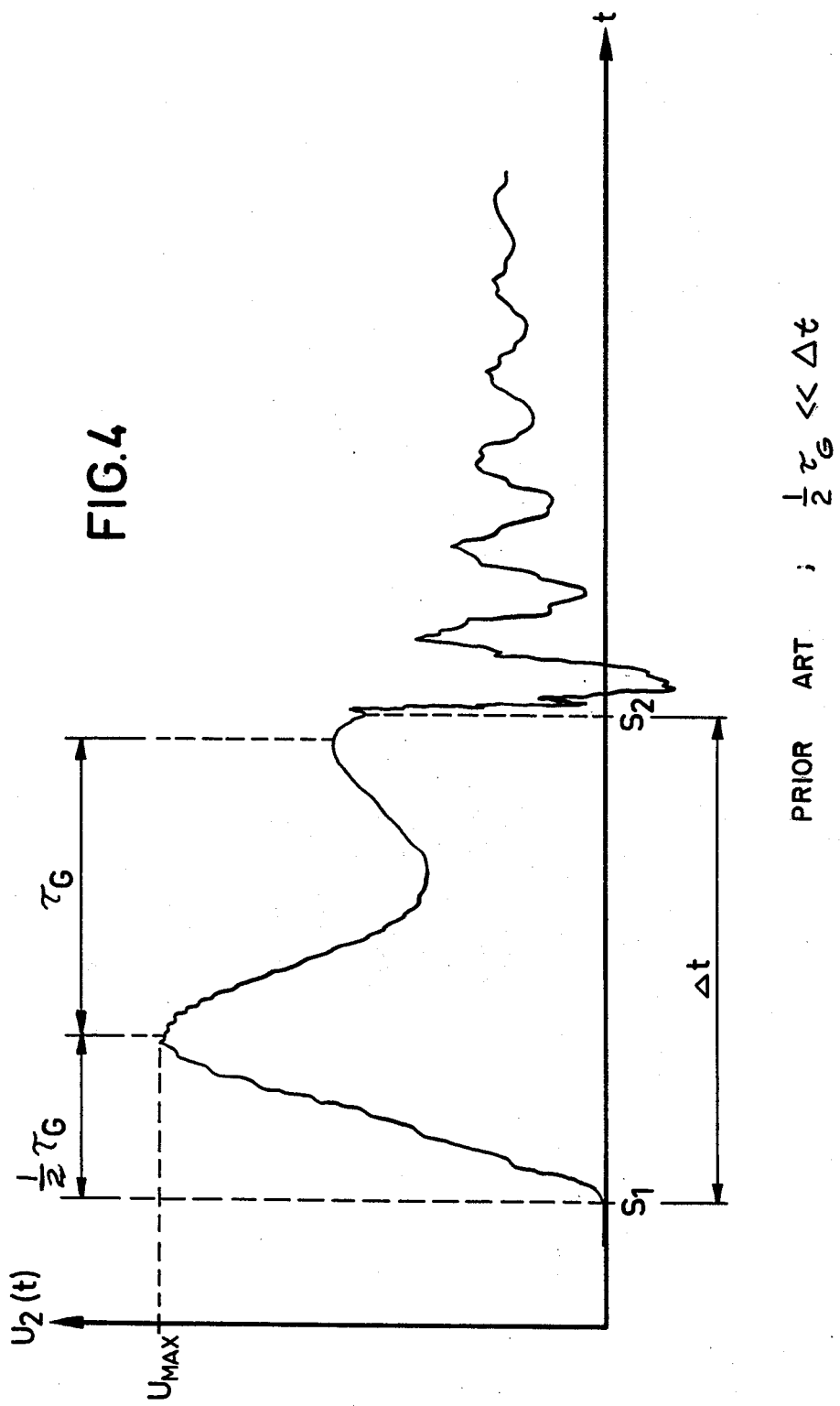
FIG. 4 graphically illustrates the conditions existing in the case of a typical prior art system, showing the oscillations in the laser electrode voltage before and after the gas breakdown.

When in a typical prior art system, as shown by FIG. 4, the normally open switch $S_1$ is actuated, the charged capacitor $C_1$ will transfer part of its charge to the relatively uncharged capacitor $C_2$. The actuating of $S_1$ will then give rise to a damped oscillation due to the resonant circuit comprising $C_1$, $C_2$, $L_1$, $L_s$ and $R_s$ and thus, the voltage $U_2$ on $C_2$ will vary according to:

$$U_2(t) \approx U_o(C_1/C_1+C_2)(1-e^{-\beta t}\cdot\cos\omega t)$$

where $U_o$ is the voltage on $C_1$ before the actuation of $S_1$ and where $$\beta = [R_s/2(L_s+L_1)]$$

and where further $$\omega = (2\pi/\tau_G) = [(L_s+L_1)(C_1C_2/C_1+C_2)]^{-\frac{1}{2}}$$

The approximate risetime $\frac{1}{2}\tau_G$ will then be $$\tau_G/2 = \pi\sqrt{(L_s+L_1)(C_1C_2/C_1+C_2)}$$

The voltage vs. time on $C_2$ is illustrated in FIG. 4. After a certain time of delay, $\Delta t$, the previously referred to gas breakdown delay time, the breakdown of the gas will occur. This will correspond to the actuation of the switch $S_2$ (FIG. 3). A second resonance circuit comprising $C_2$, $L_2$ and $R_3$ introduces a second oscillation when the gas breakdown occurs. This gas breakdown delay period, $\Delta t$, depends on $U_{max}$ (see FIG. 4), on the length and the diameter of the capillary GFC, on the gas pressure and the type of gas, and can be determined empirically.

It has always been believed that the risetime of the laser electrode voltage pulse should be as short as possible and hence the inductance (correponding to $L_s + L_1$) as low as possible. See e.g. the above cited article by Ericsson and Lindhold Ark. Fysik 37 (1968) p. 559 or Ruhl, Lindner and Fischer "Effects of a Spark Switch and Stray Capacities on the Operation of a $N_2$-Laser", Appl. Phys. 3(1974) p 245. However, we have found and proved that for optimum output and pulse to pulse reproducibility the risetime $\frac{1}{2}\tau_G$ must be matched to the gas breakdown delay period $\Delta t$ such that as shown by our FIG. 7

$$\tfrac{1}{2}\tau_G = \Delta t$$

That means that the emission of the laser pulse shall coincide with the voltage maximum on $C_2$. This adjustment or time synchronization is in the present invention carried out by means of the synchronizing inductor $L_1$.

The proper inductance value of this inductor $L_1$, thus depends on the type of laser medium, the gas pressure, the length and diameter of the capillary and on the applied maximum voltage.

As previously noted, the synchronizing inductor $L_1$ can be incoporated in, or fixedly mounted on the laser tube. In this case, tubes with synchronizing inductors $L_1$ designed for a certain voltage, e.g. 60 kV, and using a certain type of high voltage pulse generator, can be replaced or interchanged without the need for an accompanying adjustment of the high voltage pulse generator. Although not illustrated by the drawings, the synchronizing inductor can also be incorporated in the pulse generator circuit or made as a separate unit to be connected to and put in between the pulse generator and the laser tube.

In any case the inductor can be made adjustable in any prior art manner, for instance by axial compression of the inductor coil. Therefore, it is shown in FIG. 3 as a variable inductance.

Figure 5:
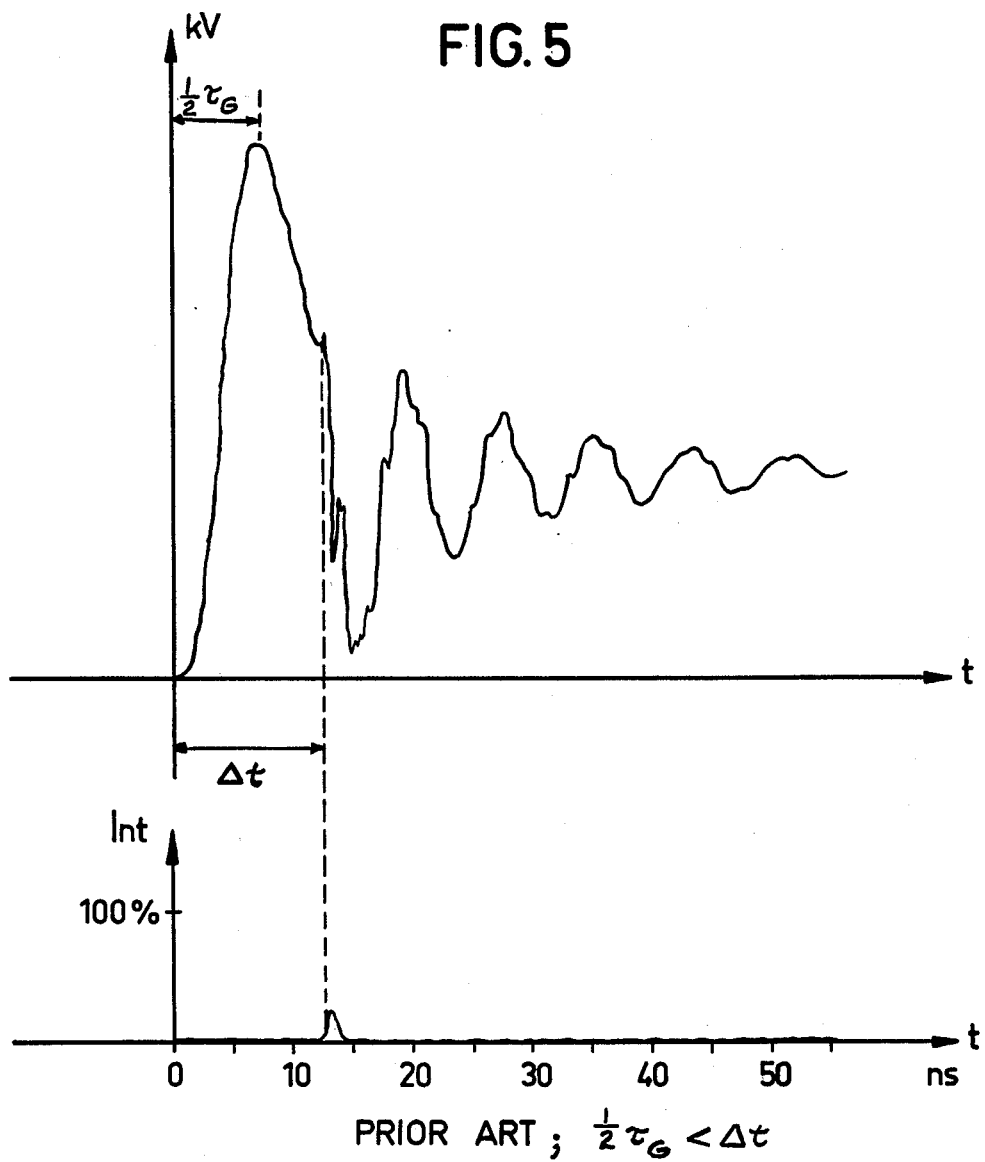
FIG. 5 graphically illustrates the shape of a typical laser electrode voltage vs. time pulse of a pulsed gas laser without a synchronizing inductor and the intensity vs. time of the corresponding laser pulse.

FIG. 5 illustrates a typical mismatch between risetime and gas breakdown delay period of a prior art laser, i.e. a pulsed gas laser without the new synchronizing inductor. The laser pulse is emitted, when the time derivative of the electrode voltage, dU/dt, is large, resulting in a bad pulse to pulse reproducibility and a low laser output energy.

Figure 6:
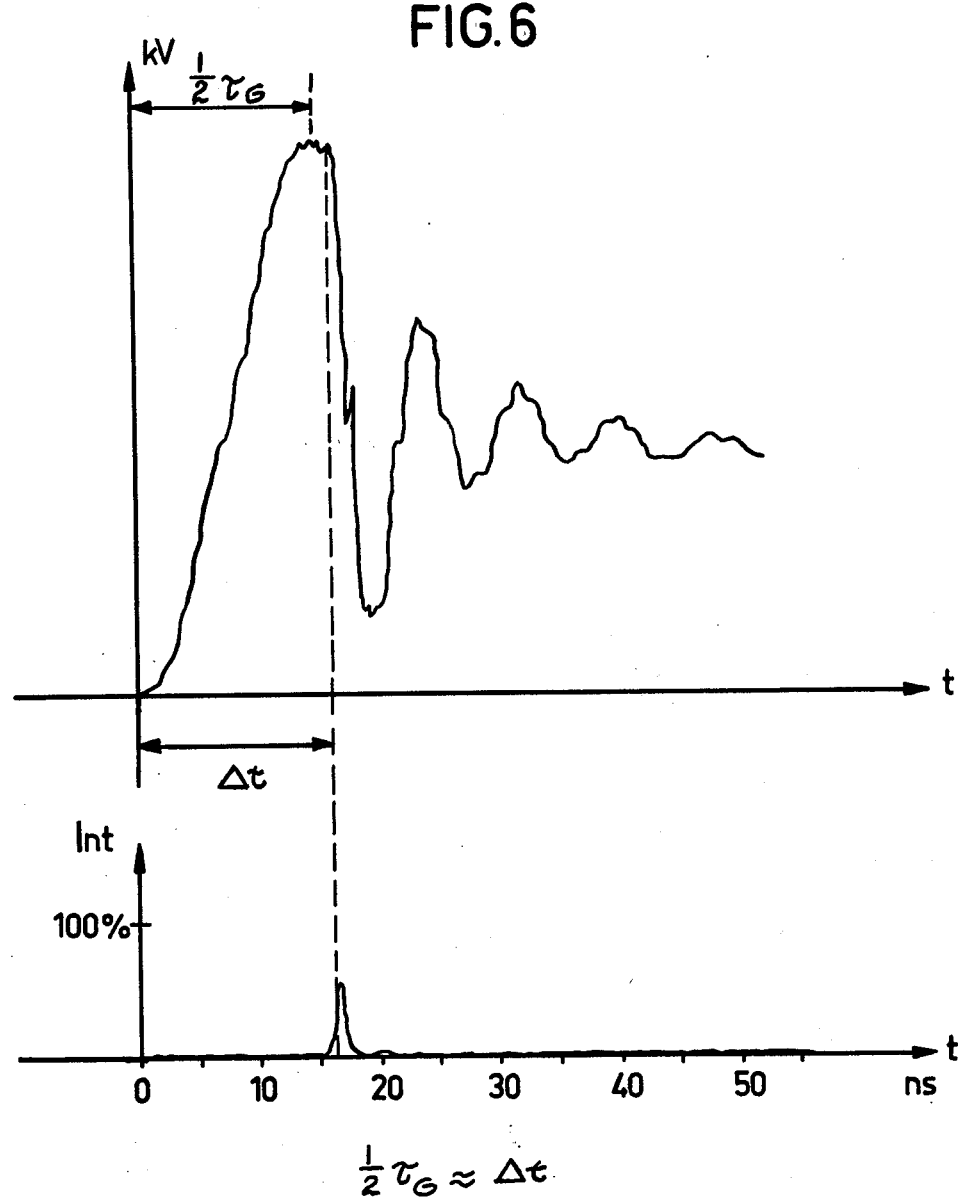
FIG. 6 graphically, on the same scale as FIG. 5, illustrates the shape of a laser electrode voltage vs. time of a pulsed gas laser with a synchronizing inductor having a too low inductance value, and the intensity vs. time of corresponding laser pulse.

FIG. 6 illustrates the relationship between the electrode voltage vs. time and the emitted laser pulse when a laser according to the present invention is provided with a synchronizing inductor with a too low inductance. Pulse to pulse reproducibility and output power are improved but not optimized.

Figure 7:
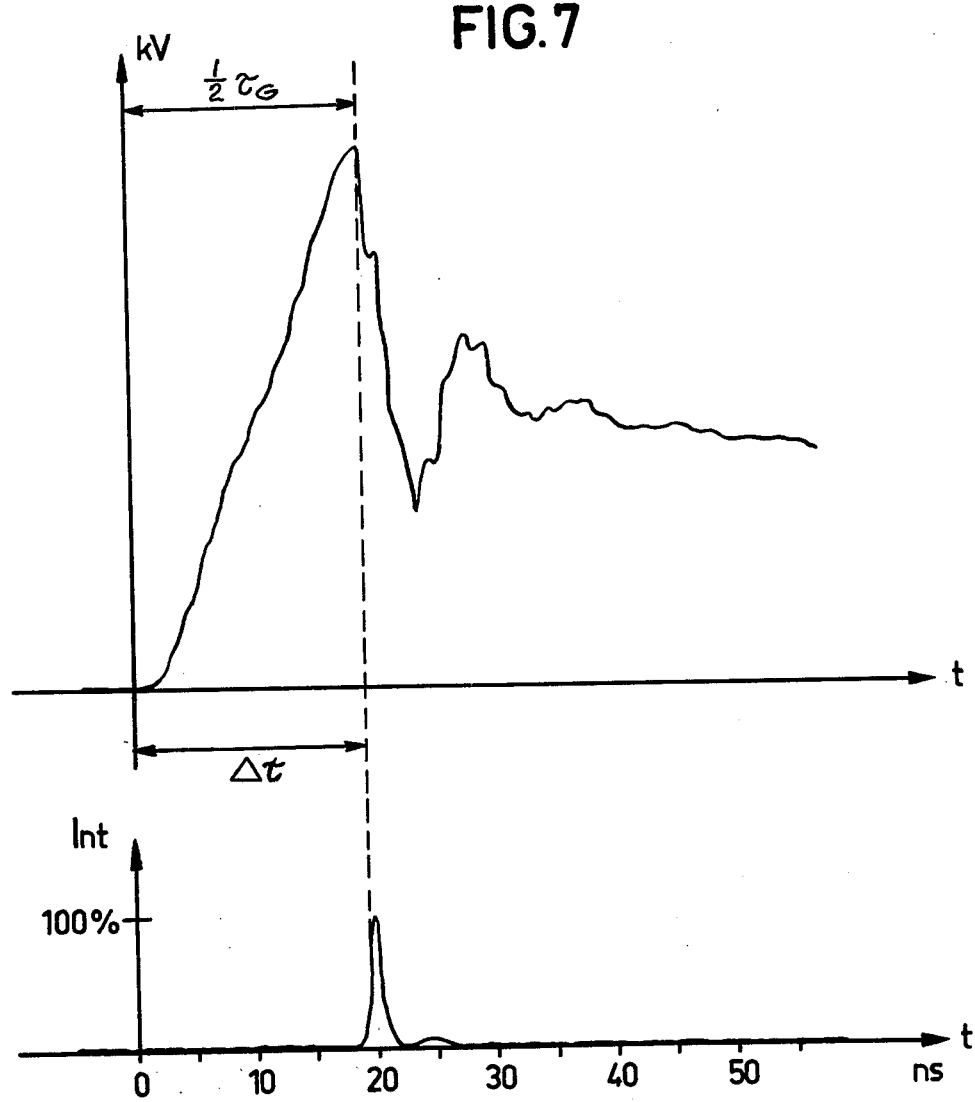
FIG. 7 graphically, on the same scale as FIG. 5, illustrates the shape of a laser electrode voltage vs. time of a pulsed gas laser with a synchronizing inductor which is given the optimum value.

FIG. 7 illustrates the same relation as FIG. 5 and 6 but using the optimum value of the synchronizing inductor of the present invention and hence showing optimum pulse to pulse reproducibility and laser output. We have achieved peak value pulse to pulse reproducibilities of typically better than 1% at pulse repetition rates of up to 400 Hz.

Figure 8:
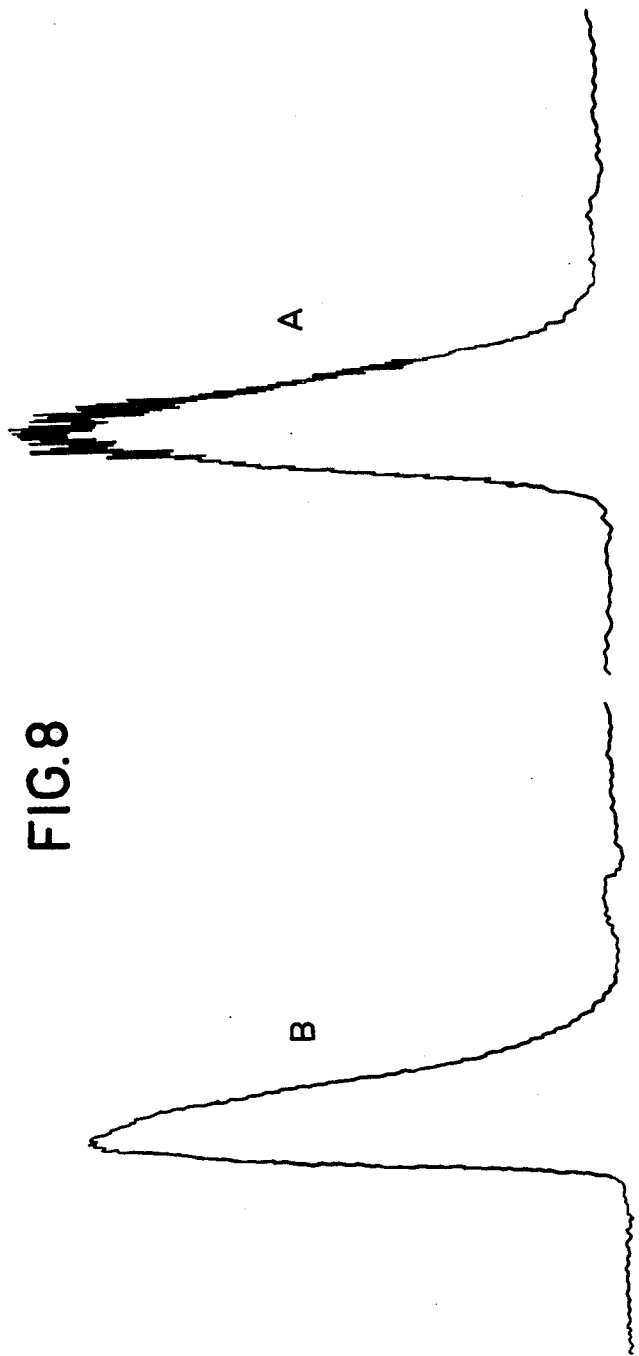
FIG. 8 graphically illustrates in detail the output pulse intensity vs. time of an unsynchronized pulsed gas laser and a synchronized pulsed gas laser according to the present invention.

FIG. 8 at last, illustrates two laser output pulses recorded by a sampling technique. Curve A corresponds to a laser with a relationship between the electrode voltage risetime and the emitted pulse as shown in FIG. 5 and curve B corresponds to a laser with optimum synchronization, as shown in FIG. 7. The bad pulse to pulse reproducibility of the laser according to the relation shown in FIG. 5 causes the overlayered noise structure of curve A.

The amplitude of curve B was several times higher than the amplitude of curve A, but the two curves have been normalized to allow better comparison between the reproducibilities of the two lasers.

What is claimed is:

1. A pulsed gas laser system comprising an elongated high voltage conductor having a back terminal end and a front end connected with a high voltage electrode, a capillary extending straight forwardly from said electrode axially with respect to said conductor to a front end having a grounded electrode forming a laser beam passage, said capillary being axially aligned with said conductor and containing gas between said electrodes and which gas after a delay period suddenly breaks down under high voltage on said high voltage terminal and produces a laser pulse through said passage, a shielding tube surrounding said conductor and capillary and connected with said grounded electrode and thereby forming a first capacitor, a second capacitor having one side connected with a source of high voltage and shunted by a high voltage switch to ground and a second side connected to the terminal end of said elongated conductor, said first and second capacitors being parts of cooperating interconnected circuits comprising a high voltage pulse-forming network, each circuit having capacitance, resistance and inductance relatively valued with respect to each other so as to produce a high voltage pulse upon actuation of said switch and which pulse rises to a maximum value on said second side of the capacitor, said maximum value being reached simultaneously with the termination of said delay period when said gas suddenly breaks down and produces said laser pulse, repetitive actuation of said switch causing the production of laser pulses with high pulse-to-pulse reproducibility.

2. The system of claim 1 in which at least part of said inductance is provided by a synchronizing inductor unit connected between said second side of said second capacitor of said high voltage pulse-forming network, and the back terminal end of said elongated conductor.

3. The system of claim 2 in which said high voltage conductor, capillary, grounded electrode, shielding tube and synchronizing inductor unit form a physically interconnected laser tube assembly, said unit being positioned adjacent to the high voltage conductor's said back terminal end.

* * * * *

UNITED STATES PATENT AND TRADEMARK OFFICE
CERTIFICATE OF CORRECTION

PATENT NO. : 4112392
DATED : September 5, 1978
INVENTOR(S) : Hans E. B. Andersson and Wladimir Wladimiroff It is certified that error appears in the above-identified patent and that said Letters Patent are hereby corrected as shown below:

Column 1, line 14, cancel "Nc" and replace with --Ne--.

Column 1, line 18, cancel "ung" and replace with --und--.

Column 3, line 21, cancel "$P_s$" and replace with --$R_s$--.

Column 3, line 23, cancel "switlch" and replace with --switch--.

Column 3, line 44, cancel "1-c" and replace with --1-e--.

Column 3, line 54, cancel "96" and replace with --τ--.

Column 4, line 25, cancel "incoporated" and replace with --incorporated--.

Signed and Sealed this

Fifteenth Day of May 1979

[SEAL]

Attest:

RUTH C. MASON
Attesting Officer

DONALD W. BANNER
Commissioner of Patents and Trademarks